United States Patent
Allison et al.

(10) Patent No.: US 10,467,148 B2
(45) Date of Patent: Nov. 5, 2019

(54) SYSTEM OF MULTIPLE CONFIGURATIONS AND OPERATING METHOD THEREOF

(71) Applicant: SK hynix Inc., Gyeonggi-do (KR)

(72) Inventors: Michael Scott Allison, Longmont, CO (US); MadhuKiran Vaddi, Fremont, CA (US)

(73) Assignee: SK hynix Inc., Gyeonggi-do (KR)

( * ) Notice: Subject to any disclaimer, the term of this patent is extended or adjusted under 35 U.S.C. 154(b) by 134 days.

(21) Appl. No.: 15/624,385

(22) Filed: Jun. 15, 2017

(65) Prior Publication Data

US 2017/0364445 A1 Dec. 21, 2017

Related U.S. Application Data

(60) Provisional application No. 62/351,170, filed on Jun. 16, 2016.

(51) Int. Cl.
| | |
|---|---|
| *G06F 12/00* | (2006.01) |
| *G06F 12/10* | (2016.01) |
| *G06F 3/06* | (2006.01) |
| *G06F 12/02* | (2006.01) |
| *G06F 12/06* | (2006.01) |
| *G06F 8/41* | (2018.01) |

(52) U.S. Cl.
CPC ............ *G06F 12/10* (2013.01); *G06F 3/0604* (2013.01); *G06F 3/0629* (2013.01); *G06F 3/0688* (2013.01); *G06F 8/41* (2013.01); *G06F 12/0246* (2013.01); *G06F 12/0653* (2013.01); *G06F 2212/1056* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2007/0024308 | A1* | 2/2007 | Azimi | G01R 31/3004 324/750.3 |
| 2008/0117682 | A1* | 5/2008 | Byeon | G06F 13/1684 365/185.18 |
| 2014/0085960 | A1* | 3/2014 | Fujioka | G11C 8/12 365/63 |
| 2014/0237220 | A1 | 8/2014 | O'Rourke et al. | |

* cited by examiner

*Primary Examiner* — Baboucarr Faal
(74) *Attorney, Agent, or Firm* — IP & T Group LLP

(57) ABSTRACT

A system and an operating method thereof include a system on chip (SOC) flash controller having at least one SOC channel; at least one memory device coupled with the at least one SOC channel; a printed circuit board (PCB), wherein the SOC flash controller and the at least one memory device are mounted thereon; a flash address translation (FTL) address translator automatically managing the at least one memory device in accordance with a PCB board configuration file of the PCB board and a drive configuration file of the at least one memory device; and a fuse storing an open data plane (ODP) fuse setting generated in accordance with at least in part with data of the PCB board configuration file and the drive configuration file.

20 Claims, 8 Drawing Sheets

SYSTEM OF MULTIPLE CONFIGURATIONS AND OPERATING METHOD THEREOF

CROSS REFERENCE TO OTHER APPLICATIONS

This application claims priority to U.S. Provisional Patent Application No. 62/351,170 filed Jun. 16, 2016, which is incorporated herein by reference for all purposes.

BACKGROUND

1. Field

Exemplary embodiments of the present disclosure relate to a system, and more particularly to a system of NAND layout configurations and operating method thereof.

2. Description of the Related Art

The computer environment paradigm has been shifted to ubiquitous computing systems that can be used anytime and anywhere. Due to this fact, the use of portable electronic devices such as mobile phones, digital cameras, and notebook computers has rapidly increased. These portable electronic devices generally use a system having memory devices, such as a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid-state drive/solid-state disk (SSD).

The SSD can include flash memory components and a SSD controller. The SSD controller can be also referred as a processor, which includes the electronics that bridge the flash memory components to the SSD input/output (I/O) interfaces. The SSD controller can include an embedded processor that can execute functional components, such as firmware. The SSD functional components are device specific, and in most cases, can be updated.

A system utilizing SSD NAND devices requires corresponding printed circuit boards (PCBs) and variety of loaded NAND packages. The system has acknowledgements of configurations of a system on chip (SOC) to the NAND packages.

Thus, there remains a need for a system and operating method thereof for multiple configurations. In view of the ever-increasing need to improve performance and security, it is more and more critical that answers be found to these problems. Solutions to these problems have been long sought but prior developments have not taught or suggested any solutions and, thus, solutions to these problems have long eluded those skilled in the art.

SUMMARY

Embodiments of the present disclosure are directed to a system having multiple configurations and operating method thereof capable of improving the performance and reliability of the system.

In accordance with an embodiment of the invention, a system includes: a system on chip (SOC) flash controller having at least one SOC channel; at least one memory device coupled with the at least one SOC channel; a printed circuit board (PCB), wherein the SOC flash controller and the at least one memory device are mounted thereon; a flash address translation (FTL) address translator automatically managing the at least one memory device in accordance with a PCB board configuration file of the PCB board and a drive configuration file of the at least one memory device; and a fuse storing an open data plane (ODP) fuse setting generated in accordance with at least in part with data of the PCB board configuration file and the drive configuration file.

In accordance with an embodiment of the invention, a method of operating a system includes: providing a PCB board; mounting a SOC flash controller having at least one SOC channel on the PCB board; mounting at least one memory device coupled with the at least one SOC channel; managing the at least one memory device in accordance with a PCB board configuration file of the PCB board and a drive configuration file of the at least one memory device automatically by a FTL address translator; and generating an ODP fuse setting in accordance with at least in part with data of the PCB board configuration file and the drive configuration file.

DETAILED DESCRIPTION

Figure 1:
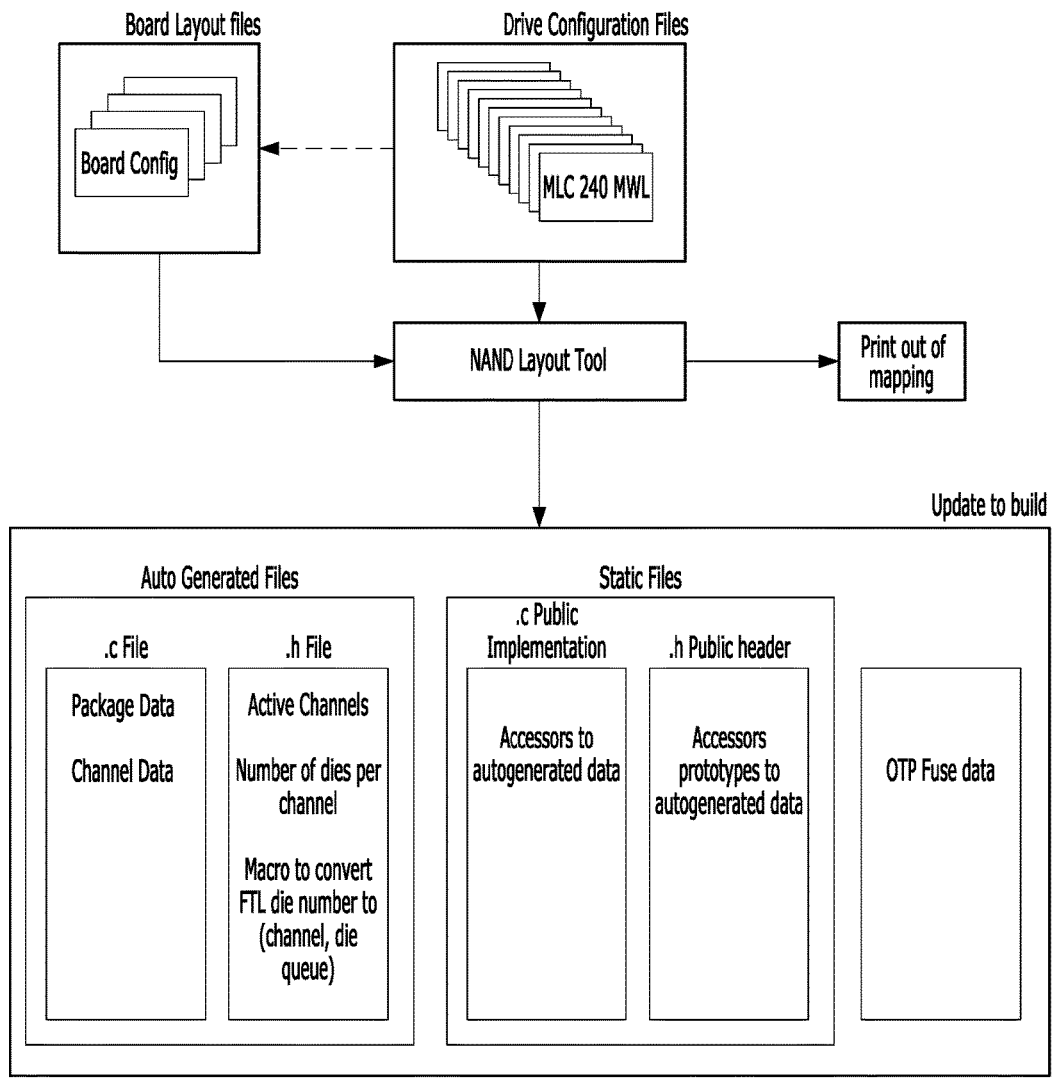
FIG. 1 is a top-level diagram illustrating management tool configuration of a system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various drawings and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying drawings that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system may comprise a SOC flash controller and multiple memory devices, such as NAND packages, wherein the SOC flash controller and multiple memory devices may be mounted on a PCB board. The types of the NAND packages may be variety. For the SYSTEM to operate appropriately, the SYSTEM may need to know configurations of the NAND packages, and choose corresponding drives having drive configuration files and corresponding PCBs having PCB configuration files.

In order to meet customer capacity needs and requirements, utilization of NAND devices having lower than expected data retention and endurance can require a mixture of PCB boards and variety of loaded NAND packages. Each of the PCB boards or the loaded NAND packages may have a corresponding configuration file thereof. Firmware in the SYSTEM may need to know exact interconnections from the SOC to the NAND packages and whether a MUX is used for selection. In some scenarios, there may be as many as 38 of such configurations utilizing at least two different PCB boards. In addition, there may be at least two development boards which can have different configurations (one utilizing MUXs).

Currently, the SYSTEM programs may have just a few configurations, and the firmware configuration files may be created manually. The manually created configuration files may be found a high risk of being inefficient and error prone. Additionally, the manually creating configuration files may limit the complexity and flexibility of the SYSTEM, since the configuration files of the drives and the PCB boards in the firmware may be too difficult to build.

The embodiments of the present invention detail an apparatus and operating method to automate management of the NAND layout configurations in the build process of the firmware, for simplification and easement to adjust the firmware in accordance with the program changes.

The build process may comprise creating a drive configuration file identifying the PCB board and the NAND packages mounted onto the said PCB board. A PCB board identification may specify electrical connections from the SOC ASIC to each of the NAND packages. A PCB board configuration file may be created to specify the said electrical connections. A tool in the firmware build, such as a NAND layout tool, can utilize information of the drive configuration files and the PCB board configuration files to create data for managing NAND dies of the NAND packages in the firmware, the management can be referred as Flash Address Translation (FTL).

The management tool can comprise two sections. First, the management tool can create configuration files of expected set of the NAND packages used during manufacturing, to make sure that assembly process is correct. Since the system may comprise multiple NAND packages during manufacturing, the matching configuration files of the NAND packages can also be provided in the assembly process. Thus, the assembly process can validate the configuration files and the NAND packages to guarantee accuracy.

Secondly, the management tool can create logical die number to physical addresses mapping used by the FTL firmware for managing the NAND packages. The management tool can either create a specific set of data for a specific drive, or can create a list of data for all the respective drives. The creation of the data can allow the firmware to be built specifically for a drive or for a set of drives, in accordance with the SDD requirements.

FIG. 1 is a top-level diagram illustrating management tool configuration of a system in accordance with an embodiment of the present invention.

The process for automatically generating the NAND layout information of the FTL utilized in the address mapping can be illustrated in FIG. 1. The automatic process can start with defining drive configuration files specifying the PCB board and the type and location of the NAND packages mounted thereon.

For example, multiple drive configuration files are provided in FIG. 1, such as a 240 GB device. The drive configuration files are provided for defining at board configuration files, such as PCB configuration files. The NAND layout tool can utilize both the drive configuration files and the board configuration files for managing the correlations between the NAND packages and the board, including creating the data for build the firmware and correlations between the board and the NAND packages. The mapping results can also be output as a printout.

The NAND layout tool can create variety of data for building the firmware. The created data can include automatically generated files, such as package data and channel data in .c format, and active channels, number of dies per channel, and macro to convert FTL die number to channels, die queues in .h format. The created data files can also include static files, such as accessors to autogenerated data in .c format as public implementation, and accessors prototypes to autogenerated data in .h format for public header. Finally, the created files can include OTP fuse data for storing the data in the fuse.

All the files created by the NAND layout tool can be in formats not limited to .c or .h, and the configuration files can be provided in variety of types. The details of the data files can be described in following.

An example of drive configuration of a system in accordance with an embodiment of the present invention can be described below.

The drive configuration file can describe the drive information, such as position of each NAND package. For example, at position A, a dual Open Data Plane (ODP) NAND package can be mounted thereon. When multiple positions are available, such as positions A, B, or C, the same type of NAND package of the dual ODP can be mounted at positions B and C, although other types of NAND packages can be mounted at different positions.

In the PCB board configuration file described below, the type of the NAND packages mounted at the specific positions, needs to match the type defined in the drive configuration file. For example, when the type of NAND packages mounted at position B is defined as dual ODP type, the NAND packages mounted at the position B need to be a dual ODP NAND package. If the NAND package mounted at the position B does not match the configuration files, the PCB board cannot function correctly, errors can occur during operation.

An example of PCB board configuration file of a system in accordance with an embodiment of the present invention can be described below.

In the PCB board configuration file, Extensible Markup Language (XML) can be used to define the configuration file containing the PCB board information. The NAND package type information can define the numbers of chip enables (CEs), logic unit numbers (LUNs) per chip enable, and location/position of the loaded NAND packages. The position of the loaded NAND packages can represent one or more than one NAND packages being loaded. The PCB board information can define the interconnections between the SOC ASIC and the NAND packages.

The PCB board configuration file can be used for implementation of defining the NAND package types and the PCB board using the XML configuration file. In the PCB board configuration file, each SOC channel can have a unique channel identification (ID), and can define the number of CE's connected to the SOC channel in the NAND packages. Each NAND package can comprise a unique package identification (ID), a loading position (position), and the connection to each SOC channel. Optionally, MUX selection can be included in each NAND package to specify the select input setting of the MUX to address the SOC channel. The position information can be defined in above described drive configuration file. The MUX can expand the CEs/data pins to different NAND packages, allowing more CE's to be connected to the ASIC than the ASIC supports.

The PCB configuration file can describe a PCB board. For example, the PCB board configuration file can define the configuration including multiple SOC channels, channel ID 0, 1, 2, 3, 4, 5, 6, and 7. In each of the channels, four NAND package IDs are described, NAND packages ID 0, 1, 2, and 3. Each of the NAND packages has 2 chip enables (CE's). The position of the NAND packages can be identified as A, B, or C. In the PCB configuration file, the "nandChannel id" defines the NAND channels, such as channel 0 or channel 1. Each NAND channel can be connected to a separate SOC channel (different) to allow the NAND packages to be shared by the SOC channels. In case a MUX is included in the PCB layout, a "muxselection" can be used to define which MUX select input the NAND package is addressed. For example, a 4-to-1 MUX is included in the PCB board configuration file having MUX select input 0, 1, 2, or 3. The MUX select input 0, 1, 2, or 3 is connected with the NAND package 0, 1, 2, or 3, respectively.

The types of the NAND package can be mounted on the corresponding positions, such as the position A, B, or C, can be defined in the drive configuration.

Figure 2:
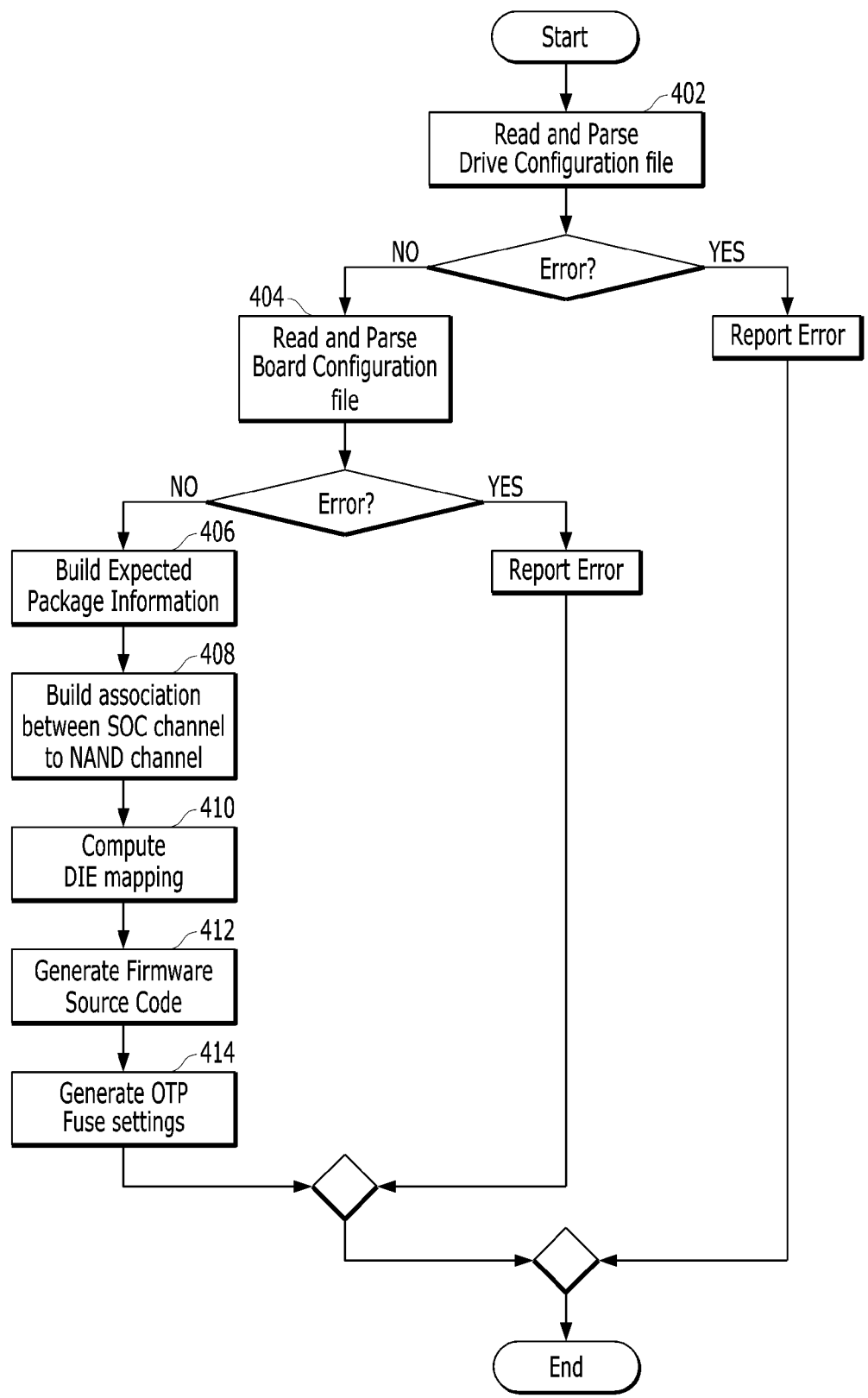
FIG. 2 is a flowchart illustrating NAND layout tool of a system in accordance with an embodiment of the present invention.

FIG. 2 is a flowchart illustrating NAND layout tool of a system in accordance with an embodiment of the present invention.

The management tool, such as the NAND layout tool, can read in the drive configuration file and the PCB configuration file, and use the flow defined in FIG. 2 to generate firmware code used during the build process managing the FTL NAND addressing. The flow chart of FIG. 2 can comprise multiple steps typically involved in the build process to generate firmware code, while alternative steps or additional steps may be involved in the process.

The drive configuration file can be read and parsed in step 402. The NAND layout tool can read in the drive configuration file, wherein the drive information in the drive configuration file can be parsed and validated. The validation of the drive information can include verification of the required drive information, to ensure all drive information necessary for build process is enclosed in the drive configuration file. The validation can also include verification of non-overlapping information, such that entities of SOC channels or NAND packages can be used only once. If an ID of the entity is repeated, then the corresponding device may be used incorrectly.

If the validation of the drive information is correct, such that no errors can be found in the drive information of the drive configuration file, the NAND layout tool can proceed to step 404 in the flow chart. If the validation of the drive information is not correct, such that errors can be found in the drive information of the drive configuration file, the NAND layout tool can proceed to the end of the flow chart. The build process of the firmware can be ended with error messages and an error report can be generated.

In the step 404, the PCB board configuration file can be read in and parsed. The NAND layout tool can read in the PCB board configuration file. The PCB board information in the PCB board configuration file can be parsed and validated. The validation of the PCB board information can include verification of the required PCB board information, to ensure all PCB board information necessary for build process is enclosed in the PCB board configuration file. The validation may also include compatibility of the PCB board information and the drive information, to ensure the PCB board information and the drive information do not contradict with each other. The validation can also include verification of non-overlapping information.

If the validation of the PCB board information is correct, such that no errors can be found in the PCB board information of the PCB board configuration file, the NAND layout tool can proceed to step 406 in the flow chart. If the validation of the PCB board information is not correct, such that errors can be found in the PCB board information of the PCB board configuration file, the NAND layout tool can proceed to the end of the flow chart. The build process of the firmware can be ended with error messages and an error report can be generated.

In the step 406, the expected package information can be built. The expected package information can include a list of every package actually mounted on the PCB board in the system. The list of every package actually mounted can be created to record expected package information, such as the NAND package types, CE's availability, counts of dies of the NAND packages, and the mapping of the NAND packages to the SOC channels.

In step 408, the association between the SOC channels and the NAND package channels can be built. The NAND layout tool first can determine minimum CE mapping utilized in the build process. Because the NAND packages loaded may use less CE's that available from the SOC channels, determination of the minimum CE mapping can be necessary to eliminate redundant mapping information. The NAND layout tool then can determine the number of dies per SOC channel. The numbers of dies per SOC channel can be same or can be different. In the initial implementation, all channels can be forced to have the same number of dies per SOC channel, however, the association of CEs to dies may be different.

In step 410, the NAND layout tool can compute the DIE mapping. First, the NAND layout tool can investigate the mapping of each SOC channel and determine the appropriate translation method. The translation method may comprise determination of the SOC channels, MUX, number of CEs, and balanced dies per CE. The balancing of dies per CE may occur when the dies are a consistent power of 2, which can allow the firmware to use bit masks and shift to perform the FTL address translation for conversions of a FTL logical die to a physical channel, MUX, CE, and LUN. In this situation, the NAND layout tool can generate the data and code necessary to use the bit manipulation. Different bit masks and shift can be selected in accordance with whether a MUX presented in the system. The different bit masks and shift can be justified to reduce firmware instructions to boost system performance when a MUX is not presented in the system.

In step 412, the NAND layout tool can generate firmware code in accordance with the information parsed from the drive configuration file and the PCB board configuration file. The generated firmware code can be used to define constants and equations needed for the FTL address translation during the build process. The generated firmware code can be specific for one drive, or can contain the entire set of data required by all the drives. The NAND layout tool does not define the FTL address translations, instead, the NAND layout tool can select the right translation type for the drive, wherein the drive can be given a set of translations to choose therefrom in accordance with the selection utilizing best performance as a priority. The set of translations for selection may be pre-determined. Further, the NAND layout tool can generate a mapping translation for each channel according to the selected right translation type. The set of data defining the expected NAND on each SOC channel can be generated and used during manufacturing for validation.

Finally, ODP fuse setting can be generated in step 414, in accordance with all the data of the PCB board configuration file and the drive configuration file, and the firmware code generated. The ODP fuse setting may be burned in a fuse, wherein the fuse can be to provide the ROM in the ASIC the NAND layout to assist the booting process. Therefore, the ROM can be used on all product capacities and across NAND products.

Figure 3:
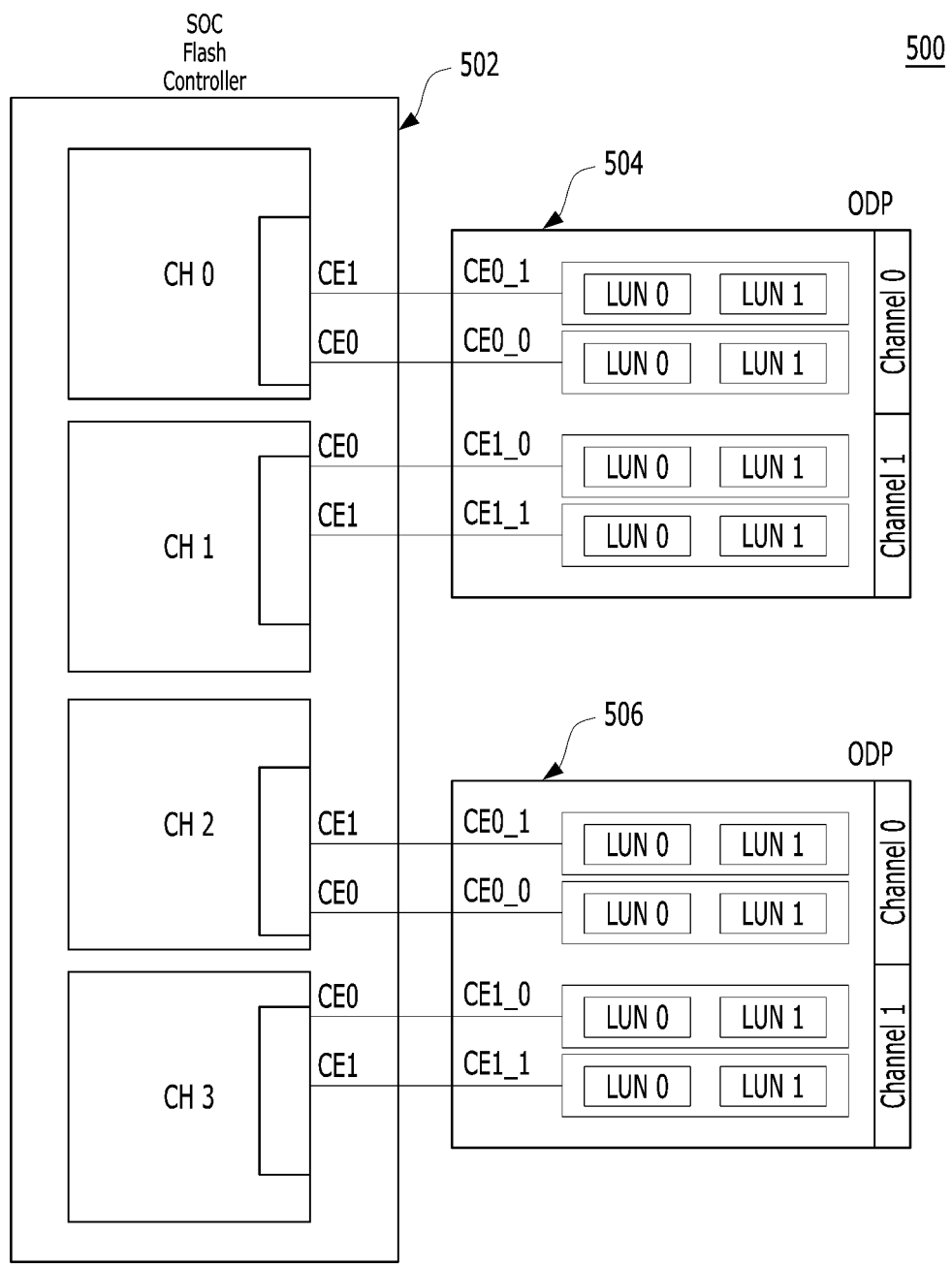
FIG. 3 is a diagram schematically illustrating a balanced NAND layout of a system in accordance with an embodiment of the present invention.

FIG. 3 is a diagram schematically illustrating a balanced NAND layout of a system in accordance with an embodiment of the present invention. The NAND layout 500 comprises a SOC flash controller 502, two memory devices, such as a first ODP 504 and a second ODP 506. The NAND layout 500 comprises four SOC channels, each channel has two chip enables CEs with two LUNs per CE. Each of the ODPs can have four chip enables corresponding to four pairs of LUN0 and LUN1. The NAND layout 500 is a balanced layout comprising constant and power of 2 channels, CEs, LUNs per CE, and the number of LUNs of each ODP are the same.

The NAND layout 500 does not use MUX for each SOC channel. The CEs of each SOC channel can be connected to corresponding LUNs directly for selection. For example, the CE1 of SOC channel 0 (CH0) can be connected directly to LUN0 and LUN1 corresponding to the CE1 of the CH0, or CE0 of SOC channel 2 (CH2) can be connected directly to LUN0 and LUN1 corresponding to the CE0 of the CH2.

Figure 4:
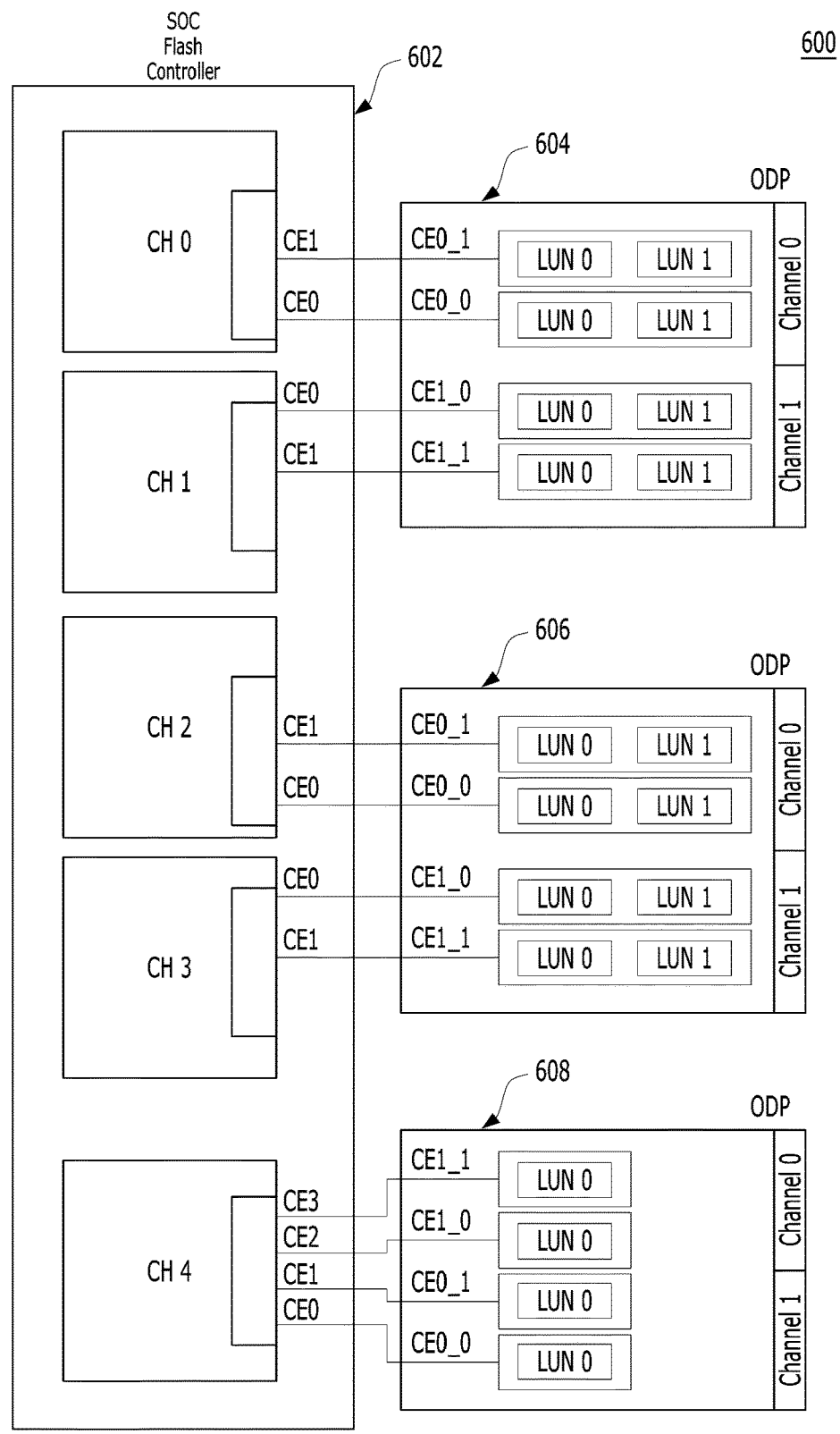
FIG. 4 is a diagram schematically illustrating an unbalanced NAND layout of a system in accordance with an embodiment of the present invention.

FIG. 4 is a diagram schematically illustrating an unbalanced NAND layout of a system in accordance with an embodiment of the present invention. The NAND layout 600 comprises a SOC flash controller 602, three memory devices, such as a first ODP 604, a second ODP 606, and a third ODP 608. The NAND layout 600 comprises five SOC channels. Except SOC channel 4 (CH4), each channel has two chip enables with two LUNs per CE. The CH4 has four chip enables, each of the CEs thereof can be connected to one of the chip enables of the third ODP 608. Since the CH4 is the only SOC channel connected to the third ODP 608, all four CEs of the CH4 can be connected with the four CEs of the third ODP 608, and further connected to four LUN0 of the third ODP 608.

The NAND layout 600 does not use MUX for each SOC channel LUNs. The third ODP 608 has only 4 LUNs while the rest ODPs have 8 LUNs controlled by the CEs from the corresponding SOC channel. The NAND layout 600 is an unbalanced layout comprising not constant and power of 2 channels, such as five channels, and the numbers of the LUNs utilized in each ODP are different.

Figure 5:
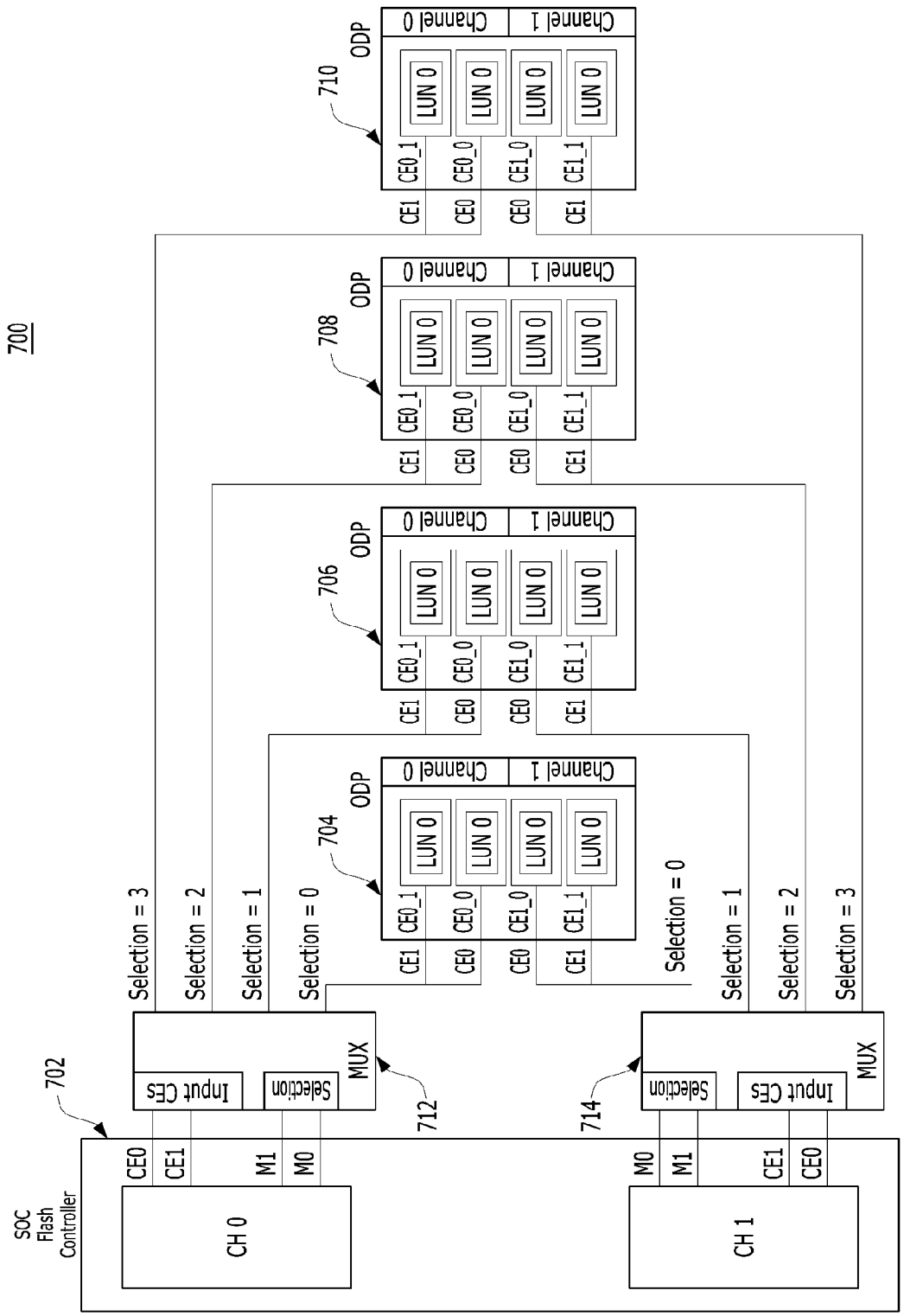
FIG. 5 is a diagram schematically illustrating a balanced NAND layout of a system in accordance with an embodiment of the present invention.

FIG. 5 is a diagram schematically illustrating a balanced NAND layout of a system in accordance with an embodiment of the present invention. The NAND layout 700 comprises a SOC flash controller 702, four memory devices, such as a first ODP 704, a second ODP 706, a third ODP 708, and a fourth ODP 710. The NAND layout 700 comprises two SOC channels, each SOC channel has two chip enables. Each SOC channel has a corresponding MUX for selection of the four ODPs by using two CEs, such as MUX 712 for the SOC channel 0 (CH0) and MUX 714 for the SOC channel 1 (CH1), respectively. In each MUX, the selecting pins, such as M0 and M1 can be used to configure selections of the ODPs corresponding to each SOC channel.

For example, the CH0 has the corresponding MUX 712. The CH0 has two chip enables CE0 and CE1, and MUX selecting pins M0 and M1. The MUX selecting pins M0 and M1 can be configured for selection of the first ODP 704, the second ODP 706, the third ODP 708, and the fourth ODP 710, when the selecting pins {M0, M1} are "00", "01", "10", and "11", respectively. Each CE of SOC channel can be connected to a LUN for each selection, such that CE1 of CH0 can be connected to LUN0 of CH0 of the first ODP 704, the second ODP 706, the third ODP 708, or the fourth ODP 710 in accordance with each selection, respectively. The NAND layout 700 is a balanced layout comprising constant and power of 2 channels, CEs, LUNs per CE, and each of the ODPs has same number of LUNs.

The NAND layout 700 comprises a MUX for each SOC channel. The CEs of each SOC channel can be connected to corresponding LUNs thereof selected by the MUX. For example, the CE1 of CH0 can be connected to LUN0 of CH0 corresponding to the CE1 of the first ODP 704 when the MUX 712 selection is "00", or CE0 of CH1 can be connected to LUN0 of CH1 corresponding to the CE0 of the third ODP 708 when the MUX 714 selection is "10".

Figure 6:
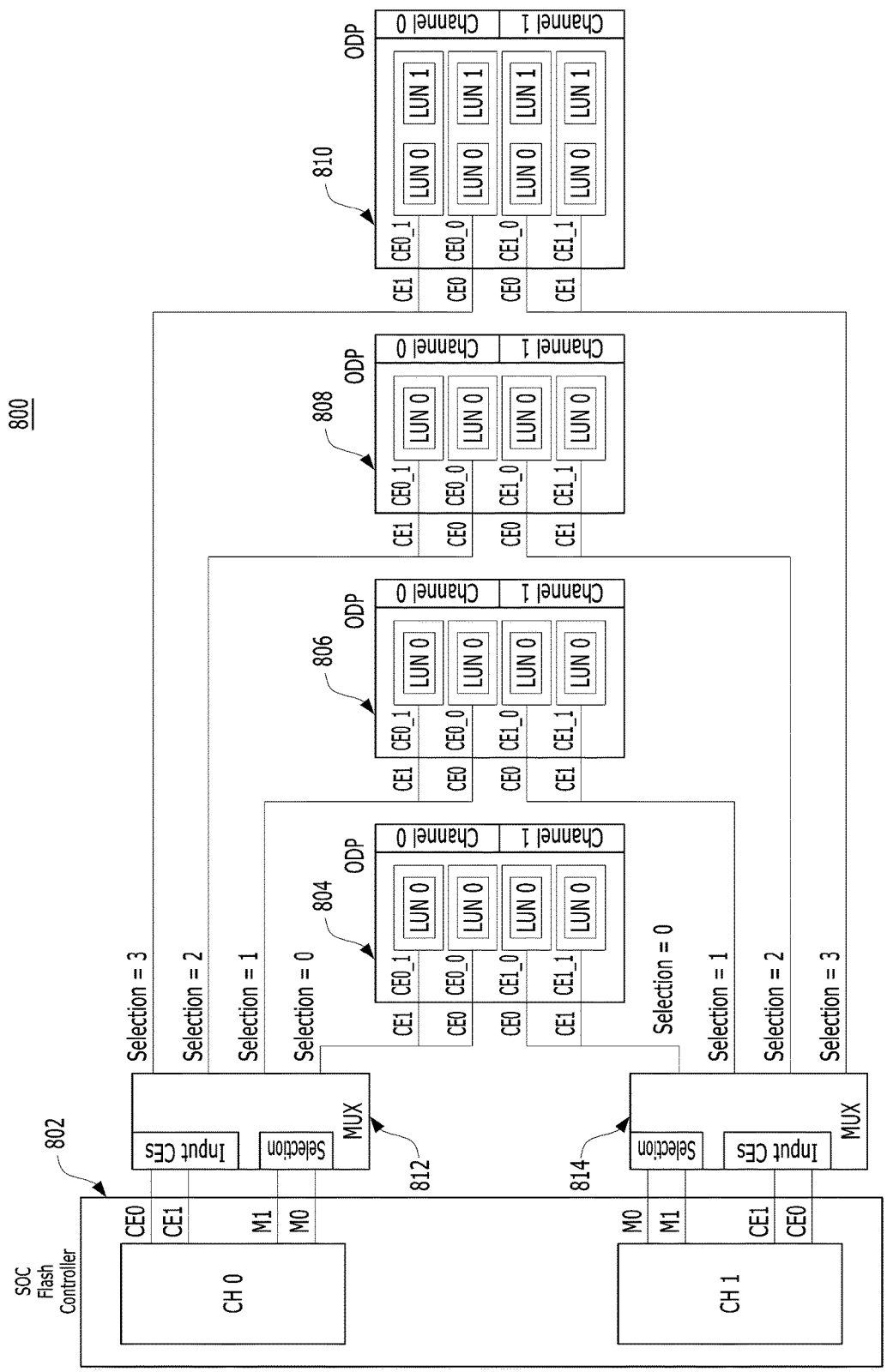
FIG. 6 is a diagram schematically illustrating an unbalanced NAND layout of a system in accordance with an embodiment of the present invention.

FIG. 6 is a diagram schematically illustrating an unbalanced NAND layout of a system in accordance with an embodiment of the present invention. The NAND layout 800 comprises a SOC flash controller 802, four memory devices, such as a first ODP 804, a second ODP 806, a third ODP 808, and a fourth ODP 810. The NAND layout 800 comprises two SOC channels, each SOC channel has two chip enables. Each SOC channel has a MUX for selection of four ODPs by using two CEs, such as MUX 812 for the SOC channel 0 (CH0) and MUX 814 for the SOC channel 1 (CH1). In each MUX, the selecting pins, such as M1 and M0, can be used to configure selections of the ODPs corresponding to each SOC channel.

For example, the CH0 has a corresponding MUX 812. The CH0 has two chip enables CE0 and CE1, and MUX selecting pins M0 and M1. The MUX selecting pins M0 and M1 can be configured for selection of the first ODP 804, the second ODP 806, the third ODP 808, and the fourth ODP 810, when the selecting pins {M0, M1} are "00", "01", "10", and "11", respectively. Each CE of the SOC channel can be connected to a LUN for each selection, such that CE1 of CH0 can be connected to LUN0 of CH0 of the first ODP 804, the second ODP 806, the third ODP 808, or the fourth ODP 810 in accordance with each selection, respectively. The NAND layout 800 is an unbalanced layout comprising constant and power of 2 channels, CEs, LUNs per CE, however, each of the ODPs has different number of LUNs. The fourth ODP 810 has four LUN0 and four LUN1, while the first ODP 804, the second ODP 806, or the third ODP 808 has only four LUN0 but no LUN1.

The NAND layout 800 comprises a MUX for each SOC channel. The CEs of each SOC channel can be connected to corresponding LUNs thereof selected by the MUX. For example, the CE1 of CH0 can be connected to LUN0 of CH0 corresponding to the CE1 of the first ODP 804 when the MUX 812 selection is "00", or CE0 of CH1 can be connected to LUN0 and LUN1 of CH1 corresponding to the CE0 of the fourth ODP 810 when the MUX 814 selection is "11".

Figure 7:
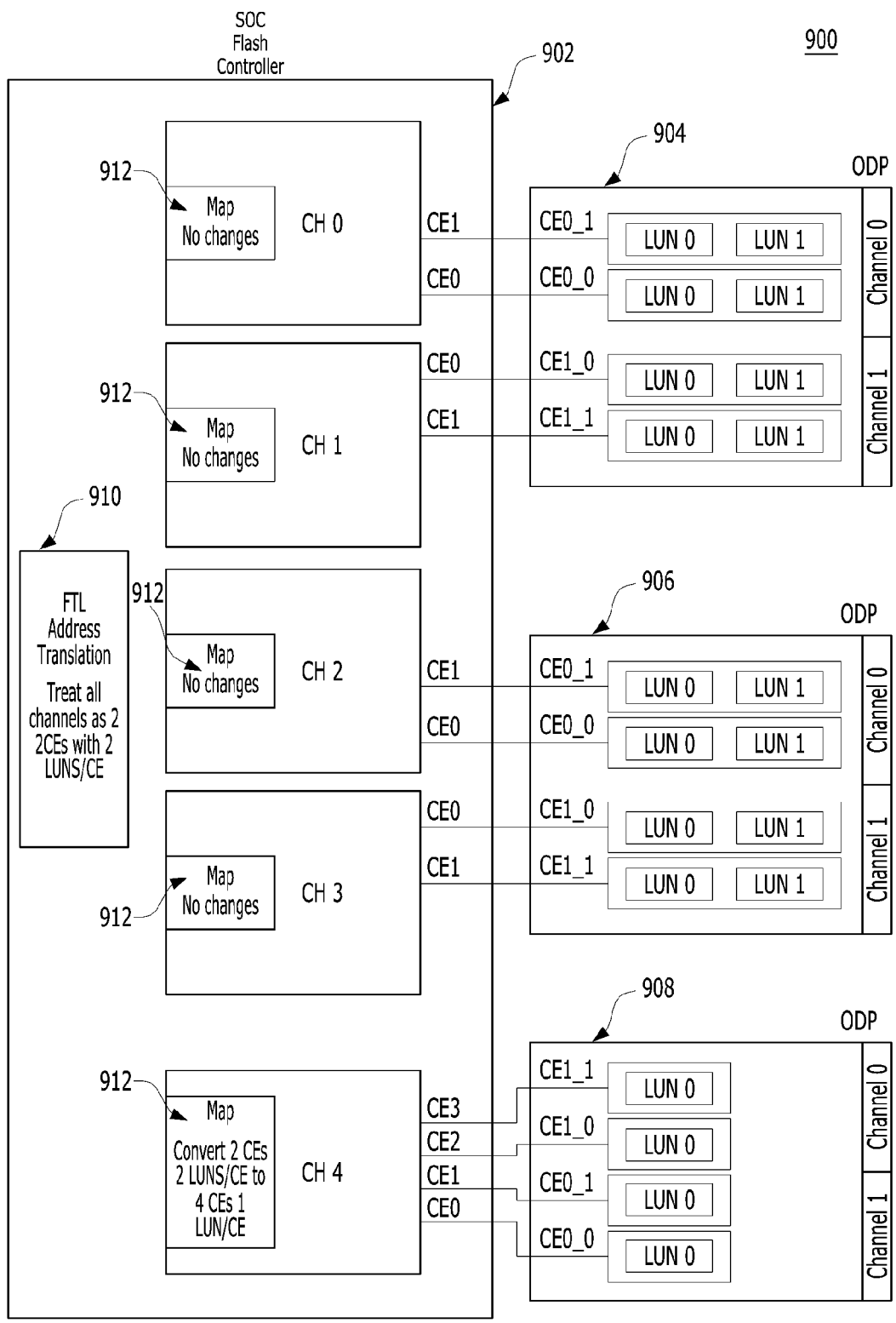
FIG. 7 is a diagram schematically illustrating an unbalanced NAND layout of a system in accordance with an embodiment of the present invention.

FIG. 7 is a diagram schematically illustrating an unbalanced NAND layout of a system in accordance with an embodiment of the present invention. The NAND layout 900 comprises a SOC flash controller 902, three memory devices, such as a first ODP 904, a second ODP 906, and a third ODP 908. The NAND layout 900 comprises a FTL address translator 910 and five SOC channels, wherein each of the SOC channels can have a mapping convertor 912. Each ODP has four inputs of CEs, wherein the four CEs of each ODP can be connected to the CEs of the SOC channels for enabling LUNs. No MUX is used in the NAND layout 900, while one or more MUX can be used in the NAND layout in other embodiments of the present invention.

The FTL address translator 910 can manage and translate the logical die number to physical addresses. To simplify the translation method, the FTL address translator 910 can treat all SOC channels the same, such that each SOC channel has two CEs with two LUNs per CE.

For example, the SOC channel 0 (CH0) has two chip enables CE0 and CE1, wherein the CE0 can be connected to one of the four CEs of the first ODP 904, such as CE0_0, and the CE1 can be connected to another one of the four CEs of the first ODP 904, such as CE0_1. Each CE of the first ODP 904 can be connected to a set of a LUN0 and a LUN1 of the first ODP 904 corresponding to CH0. Respectively, the CEs of the SOC channel 1 (CH1), the SOC channel 2 (CH2), and the SOC channel 3 (CH3), can be connected to one of the four CEs of the first ODP 904, such as CE1_0 and CE1_1 thereof, or one of the four CEs of the second ODP 906. Each CE of the first ODP 904 and the second ODP 906 can be connected to a set of a LUN0 and a LUN1 thereof corresponding to the SOC channel, respectively. Since the number of the CEs of SOC channel pairs, such as the pair of CH0 and CH1, the pair of CH2 and CH3, are the same as the numbers of CEs of the corresponding ODP, the mapping convertor 912 of the CH0, CH1, CH2, or CH3, may not be enabled for converting the CEs of the SOC channels for mapping the CEs of the ODPs.

The NAND layout shown in FIG. 7 is the layout across channels that do not have a power of 2 or consistent use of bit shifting. In this scenario, a table lookup may be generated to convert the FTL logical die number to the NAND package physical address. The creation of the table lookup may use more memory in the system but simplify the firmware, and result in better performance.

In some of the systems, a microprocessor may be embedded in each channel, a mapping translation map can be given to each channel that does a conversion to allow the FTL address translation assuming a consistent number of CEs and LUNs per CE. The assumption may only apply if the equations of (number of CEs*LUNs/CE) are equivalent on each SOC channel. When the equations are equivalent on each SOC channel, the NAND layout tool may generate the mapping translation for each SOC channel and cause the FTL translation to use a consistent CE's and LUNs per CE across the system.

For example, the NAND layout 900 has five SOC channels, wherein the number of the SOC channels are not constant and power of 2. The FTL address translator 910 can treat each SOC channel as two CEs with two LUNs per CE during translation of logic addresses and physical addresses. However, the number of CEs of the third ODP 908 is four, and no additional SOC channel can be paired with the SOC channel 4 (CH4). The mapping convertor 912 can convert the two CEs from the FTL to four CEs of the CH4 with one LUN per CE, wherein the number of the CEs of the CH4 are matching the number of the CEs of the third ODP 908.

The management tool, such as the FTL address translator 910, can create configuration files of the NAND packages used during manufacturing, such as the first ODP 904, the second ODP 906, or the third ODP 908, to make sure that assembly process is correct. The configuration files of the NAND packages can also be provided in the assembly process. Thus, the assembly process can validate the configuration files and the NAND packages to guarantee accuracy.

The FTL address translator 910 can also create logical die number to physical addresses mapping used by the FTL firmware for managing the NAND packages, such as the first ODP 904, the second ODP 906, or the third ODP 908. The FTL address translator 910 can create a specific set of data for a specific drive, such as the CH0, CH1, CH2, CH3, CH4, or CH5, respectively. Or the FTL address translator 910 can create a list of data for all the respective drives, such as CH0, CH1, CH2, CH3, CH4, and CH5. The creation of the data can allow the firmware to be built specifically for a drive or for a set of drives, in accordance with the system requirements.

The firmware build process can be used on any system utilizing NAND packages as the mapping from the SOC using chip enables (CEs) to actual NAND devices required. Additionally, the firmware build process may have a simple ability to define the electrical connections to NAND packages for building the NAND layout information required by the firmware to manage the NAND packages. The automation build process can be less prone to error than manual creation of the files, and can simplify adding/removing/changing configurations procedures as demanded.

Figure 8:
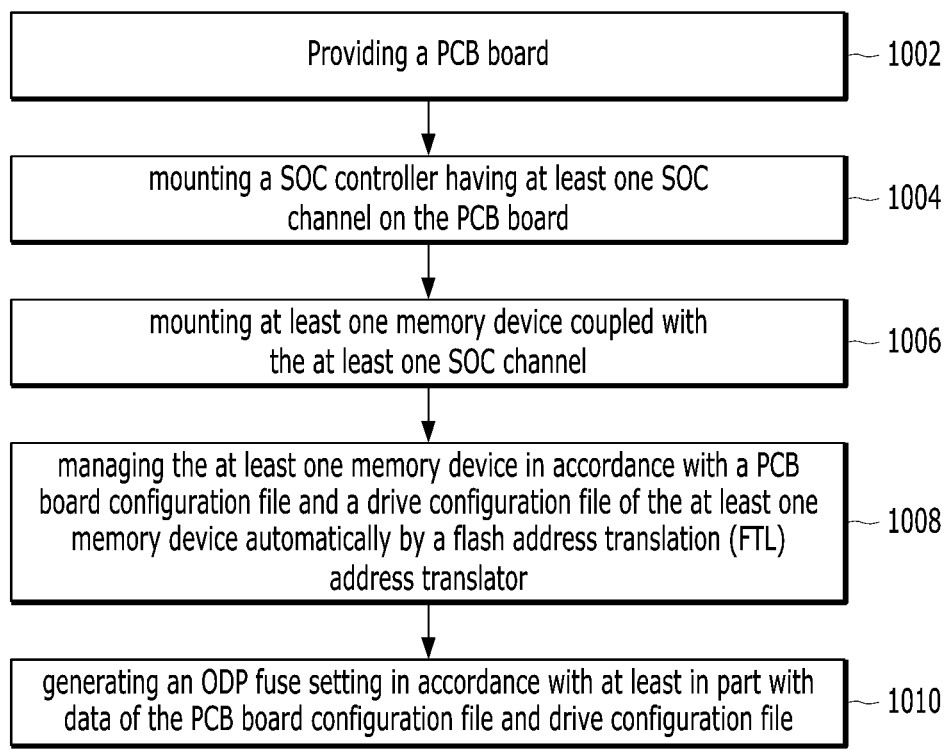
FIG. 8 is a flowchart illustrating an operating method of a system in accordance with a further embodiment of the present invention.

FIG. 8 is a flowchart illustrating an operating method of a system in accordance with a further embodiment of the present invention. The method can include: providing a PCB board in a block of 1002; mounting a SOC flash controller having at least one SOC channel on the PCB board in a block of 1004; mounting at least one memory device coupled with the at least one SOC channel in a block of 1006; managing the at least one memory device in accordance with a PCB board configuration file of the PCB board and a drive configuration file of the at least one memory device automatically by a FTL address translator in a block of 1008; and generating an ODP fuse setting for the ROM to provide the non-volatile information for booting given the configuration of NAND, in accordance with at least in part with data of the PCB board configuration file and drive configuration file in a block of 1010.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A system comprising:
a system on chip (SOC) flash controller having at least one SOC channel;
at least one memory device coupled with the SOC flash controller through the at least one SOC channel;
a printed circuit board (PCB), on which the SOC flash controller and the at least one memory device are mounted;
a flash address translation (FTL) address translator automatically managing the at least one memory device in accordance with a PCB board configuration file of the PCB board and a drive configuration file of the at least one memory device, wherein the PCB board configuration file specifies electrical connections between the SOC flash controller and the at least one memory device and the drive configuration file specifies position of the at least one memory device on the PCB board; and
a fuse storing an open data plane (ODP) fuse setting generated, at least in part, in accordance with data of the PCB board configuration file and the drive configuration file.

2. The system of claim 1, wherein the FTL address translator creates logical to physical mapping for managing the drive configuration file of the at least one memory device.

3. The system of claim 1, wherein the FTL address translator creates the drive configuration file for the at least one memory device.

4. The system of claim 1, wherein the FTL address translator creates a specific set of data for a specific drive of the at least one memory device.

5. The system of claim 1, wherein the FTL address translator creates a list of data for all drives of the at least one memory device.

6. The system of claim 1, wherein the drive configuration file includes information of a type of the at least one memory device at a corresponding position.

7. The system of claim 1, wherein the PCB board configuration file includes number of chip enables (CEs), corresponding SOC channel, and position of the at least one memory device, for the at least one SOC channel.

8. The system of claim 1, further comprising a MUX for the at least one SOC channel.

9. The system of claim 8, wherein the PCB board configuration file includes number of chip enables (CEs), corresponding SOC channel, selection of the MUX, and position of the at least one memory device, for the at least one SOC channel.

10. The system of claim 1, wherein the at least one SOC channel includes a mapping convertor balancing number of CEs of the FTL address translator and number of CEs of the at least one memory device.

11. An operating method of a system comprising:
providing a printed circuit board (PCB) board;
mounting a SOC flash controller having at least one SOC channel on the PCB board;
mounting at least one memory device coupled with the SOC flash controller through the at least one SOC channel;
managing, automatically by a flash address translation (FTL) address translator, the at least one memory device in accordance with a PCB board configuration file of the PCB board and a drive configuration file of the at least one memory device, wherein the PCB board configuration file specifies electrical connections between the SOC flash controller and the at least one memory device and the drive configuration file specifies position of the at least one memory device on the PCB board; and
generating an ODP fuse setting, at least in part, in accordance with data of the PCB board configuration file and the drive configuration file.

12. The method of claim 11, wherein the automatically managing the at least one memory device includes creating logical to physical mapping for managing the drive configuration file of the at least one memory device.

13. The method of claim 11, wherein the automatically managing the at least one memory device includes creating the drive configuration file for the at least one memory device.

14. The method of claim 11, wherein the automatically managing the at least one memory device includes creating a specific set of data for a specific drive of the at least one memory device.

15. The method of claim 11, wherein the automatically managing the at least one memory device includes creating a list of data for all drives of the at least one memory device.

16. The method of claim 11, wherein the automatically managing the at least one memory device includes creating the drive configuration file defining a type of the at least one memory device at a corresponding position.

17. The method of claim 11, wherein the automatically managing the at least one memory device includes creating a PCB board configuration file defining number of chip enables (CEs), corresponding SOC channel, and position of the at least one memory device, for the at least one SOC channel.

18. The method of claim 11, further comprising mounting a MUX for the at least one SOC channel.

19. The method of claim 18, wherein the automatically managing the at least one memory device includes creating a PCB board configuration file including number of chip enables CEs, corresponding SOC channel, selection of the MUX, and position of the at least one memory device, for the at least one SOC channel.

20. The method of claim 11, wherein the mounting at least one SOC channel includes mounting at least one SOC channel having a mapping convertor balancing number of CEs of the FTL address translator and numbers of CEs of the at least one memory device.

* * * * *